US009312535B2

(12) United States Patent
Kang

(10) Patent No.: US 9,312,535 B2
(45) Date of Patent: Apr. 12, 2016

(54) SILICON OXIDE FOR ANODE OF SECONDARY BATTERY, METHOD FOR PREPARING THE SAME AND ANODE OF SECONDARY BATTERY USING THE SAME

(75) Inventor: Yun-Kyu Kang, Incheon (KR)

(73) Assignee: Yeil Electronics Co., Ltd., Incheon (KR)

( * ) Notice: Subject to any disclaimer, the term of this patent is extended or adjusted under 35 U.S.C. 154(b) by 0 days.

(21) Appl. No.: 14/371,067

(22) PCT Filed: Feb. 10, 2012

(86) PCT No.: PCT/KR2012/001022
§ 371 (c)(1),
(2), (4) Date: Jul. 8, 2014

(87) PCT Pub. No.: WO2013/105690
PCT Pub. Date: Jul. 18, 2013

(65) Prior Publication Data
US 2014/0349190 A1    Nov. 27, 2014

(30) Foreign Application Priority Data

Jan. 9, 2012    (KR) .................. 10-2012-0002265

(51) Int. Cl.
| | |
|---|---|
| *H01M 4/13* | (2010.01) |
| *H01M 4/131* | (2010.01) |
| *H01M 4/48* | (2010.01) |
| *H01M 4/134* | (2010.01) |
| *C01B 33/113* | (2006.01) |
| *H01M 4/133* | (2010.01) |
| *H01M 4/485* | (2010.01) |

(Continued)

(52) U.S. Cl.
CPC ............. *H01M 4/131* (2013.01); *C01B 33/113* (2013.01); *C01B 33/126* (2013.01); *C01B 33/18* (2013.01); *H01M 4/133* (2013.01); *H01M 4/134* (2013.01); *H01M 4/48* (2013.01); *H01M 4/485* (2013.01); *H01M 4/625* (2013.01); *C01P 2004/64* (2013.01); *H01M 4/366* (2013.01); *H01M 10/052* (2013.01); *H01M 2004/027* (2013.01); *Y02E 60/122* (2013.01); *Y02P 70/54* (2015.11); *Y10T 428/2982* (2015.01)

(58) Field of Classification Search
CPC ...................................................... H01M 4/48
See application file for complete search history.

(56) References Cited

U.S. PATENT DOCUMENTS

| | | | |
|---|---|---|---|
| 6,759,160 B2 | 7/2004 | Fukuoka et al. | |
| 2003/0118905 A1* | 6/2003 | Fukuoka et al. | ............ 429/218.1 |

(Continued)

FOREIGN PATENT DOCUMENTS

| | | |
|---|---|---|
| CN | 101136491 A | 3/2008 |
| JP | 2001-243535 | 9/2001 |

(Continued)

OTHER PUBLICATIONS

Wang, Jing, et al.; "Nano-sized SiOx/C composite anode for lithium ion batteries"; Journal of Power Sources, 196 (2011) 4811-4815.

*Primary Examiner* — Jane Rhee
(74) *Attorney, Agent, or Firm* — The Webb Law Firm

(57) ABSTRACT

Provided is a silicon oxide for an anode of a secondary battery, having a good mechanical lifespan and electrical properties, and a method for preparing the same and an anode of a secondary battery using the silicon oxide. According to the method, a mixture is prepared by mixing $SiCl_4$ and ethylene glycol, a gel is manufactured by stirring the mixture, and the gel is heat treated to prepare silicon oxide for an anode of a secondary battery.

8 Claims, 2 Drawing Sheets

(51) Int. Cl.
*H01M 4/62* (2006.01)
*C01B 33/12* (2006.01)
*C01B 33/18* (2006.01)
*H01M 4/36* (2006.01)
*H01M 4/02* (2006.01)
*H01M 10/052* (2010.01)

(56) References Cited

U.S. PATENT DOCUMENTS

2006/0147797 A1 7/2006 Wu et al.
2008/0135801 A1 6/2008 Kizaki et al.
2011/0256452 A1 10/2011 Cho et al.

FOREIGN PATENT DOCUMENTS

| | | |
|---|---|---|
| JP | 2002-260651 | 9/2002 |
| JP | 2005-085717 | 3/2005 |
| JP | 2006-190642 | 7/2006 |
| JP | 2011-142021 | 7/2011 |
| KR | 2003-0055091 | 7/2003 |
| KR | 10-2007-0020130 | 2/2007 |
| KR | 10-1036288 | 5/2011 |
| KR | 10-2011-0116585 | 10/2011 |
| WO | 2012/036354 | 3/2012 |

* cited by examiner

SILICON OXIDE FOR ANODE OF SECONDARY BATTERY, METHOD FOR PREPARING THE SAME AND ANODE OF SECONDARY BATTERY USING THE SAME

CROSS-REFERENCE TO RELATED APPLICATIONS

This application is the United States national phase of International Application No. PCT/KR2012/0001022 filed Feb. 10, 2012, and claims priority to Korean Patent Application No. 10-2012-002265 filed Jan. 9, 2012, the disclosures of which are hereby incorporated in their entirety by reference.

TECHNICAL FIELD

The present invention relates to silicon oxide (SiOx) for an anode of a secondary battery, particularly, for a lithium secondary battery, and an anode for a secondary battery using the same.

BACKGROUND ART

Recently, the securing of new sources of energy has garnered worldwide attention due to the depletion of fossil fuel sources and global warming. Accordingly, the importance of energy storage for the efficient use of energy, together with the development of new and renewable sources of energy is on the rise.

Particularly, in the automobile field, the development of electric vehicles has been urgently demanded, due to the depletion of fossil fuels. However, when common lithium secondary batteries are used as energy storage devices in electric vehicles, trips taken at distances over about 200 kilometers are somewhat difficult to undertake on a single charge. In addition, the common lithium secondary battery is not appropriate for storing electrical power generated by new and renewable energy sources over long periods of time.

In this regard, the development of a novel material having high capacity and high output and design techniques is necessary. Particularly, attention is focused on the development of anode materials, as the development of cathode materials has stagnated due to inherent limitations of materials commonly used therefor. As the anode material of the secondary battery, graphite-based materials are used, however, such graphite-based materials have a low capacity (theoretical capacity: about 372 mAh/g, about 830 mAh/ml; reversible capacity: about 330 mAh/g). Thus, the development of a replaceable anode material having a capacity of about 500 mAh/g or more is emerging as a new material for use in the realization of a high capacity lithium secondary battery.

Si-based materials have been prominent as replaceable anode materials instead of graphite-based materials. The greatest advantage of such Si-based materials is a storage capacity of about 4 times by unit volume, and about 10 times by the unit weight when compared with that of graphite. In addition, when a battery is manufactured with $LiCoO_2$, $LiMn_2O_4$, or the like, about 3.4 V may be obtained, a voltage level lower by only 0.3 V than a presently used battery having a voltage of 3.7 V. Thus, when an anode material, stable during charging and discharging, is formed, a battery containing such a material may be immediately commercialized.

When considering the weight and volume thereof after a reaction with lithium was conducted, graphite-based materials exhibited a small change; however, metal-based materials, including Si-based materials, exhibited a very large change in volume. In the case that lithium is intercalated into graphite and an intercalation reaction occurs therebetween, lithium is present between graphite layers, and the structure of the graphite remains largely intact. However, metal elements such as Si have an alloying reaction when combined with lithium, and an alloy phase (LixM) having a new structure and composition may be formed. The alloy phase formed by the reaction of the metal element with lithium has an ionic phase, and a high degree of brittleness may be present. Thus, when a volume of such a material increases, mechanical stress may be generated, and mechanical breakage may easily occur. Therefore, when a metal-based material including Si is used as an anode material of a lithium secondary battery, cracks may be generated in an electrode, and electrical contact between an active material and an electrode may be deteriorated. In this case, capacity may largely decrease according to the progress of a cycle, and a battery lifespan may be decreased.

Meanwhile, a solid phase reaction method may be used as a method for manufacturing an anode material. A typical solid phase reaction method is a gas phase spraying method. A gas phase spraying method is a method for preparing silicon oxide in which an amount of metallic silicon is increased. In such a gas phase spraying method, a particle diameter of silicon oxide may be relatively easily controlled by controlling the conditions of a preparation reaction, and thus, particle size distribution may be good, and a clean surface may be obtained. However, in the case of a gas phase spraying method, the selection of particle size of minute particles may be difficult, repeated sintering and pulverizing processes may be necessary, and manufacturing costs and manufacturing times may be greatly increased. In addition, particle size uniformity and the homogeneity of chemical compositions may be problematic.

To solve the above-described issues, a liquid phase preparation method has been developed, of which a sol-gel method is typical. When a transition-metal oxide powder is prepared using the sol-gel method, nanoscale lithium ions and nanoscale transition-metal ions are mixed. Thus, an active material having a very small particle size, a large surface area, homogeneous particle size distribution, and a homogeneous composition may be obtained through a sol-gel liquid phase preparation method as compared to a powder prepared by a solid phase reaction method.

A sol-gel reaction basically includes a hydrolysis reaction and a condensation reaction. A colloid is a suspension in which the size of dispersed-phase particles distributed therein is microscopic, gravitational force affecting particles is negligible, and interactions between particles are controlled by Van der Waals force or an influence such as a surface charge, or the like. This kind of suspension may produce a polymer that may form particles, and a precursor for forming the suspension includes a metal-alkoxide such as methoxide, ethoxide, propoxide, butoxide, or the like, a metal-acetylacetonate, a metal-acetate, etc.

When such a precursor reacts with water, a hydrolysis reaction may proceed at rapid rate, and this reaction may be completely completed or partially completed according to the amount of water or the influence of a catalyst. Once the hydrolysis reaction is completed, even partially, the condensation reaction may proceed while generating water or alcohol, and finally, a polymer in which all molecules are connected may be formed.

An independent solid in which all molecules present in a sol make bonds through a liquid medium, and fluidity is eliminated, is referred to as a gel. To form the gel as described above, a hydrolysis reaction for forming an OH-bond is necessary, and this reaction is dependent on (or sensitive to) the pH of a solution.

Basically, a condensation reaction occurs simultaneously with olation and oxalation reactions. An olation reaction is a reaction in which the formation of a hydroxyl bridge occurs, allowing for a condensation reaction with partially condensed additional units to continuously occur, while an oxalation reaction is a reaction in which the forming of an oxo bridge between the central atoms of metal molecules occurs.

In addition, the rates of the hydrolysis reaction and the condensation reaction may vary, according to the properties of a metal ion M. When such reaction rates are different, and the hydrolysis reaction of an optional metal M occurs continuously, the condensation reaction of an additional metal M" may be conducted. In such circumstances, the overall chemical composition of a gel may become non-uniform. Thus, a chelating agent forming a bidentate with a metal ion to control the reaction rate may be added to control the rates of hydrolysis and condensation, to ultimately obtain a gel having uniform distribution of a chemical composition. The chelating agent may include various compounds such as PAA, PVB, citric acid, glycolic acid, glycine, ethylene glycol, and the like, and it has been reported that a gel having good properties may be obtained by using the chelating agent.

According to the above-described methods, the manufacturing of a commercialized powder has limitations in terms of using a relatively expensive starting material, reaction products during an oxidation, a reduction, a preparation reaction, and restrictions on the size of particles.

To solve the above-described defects, a method of preparing silicon oxide is provided in Patent Documents 1 to 3, including inserting a mixed raw powder including a silicon dioxide powder into an inert atmosphere under a reduced pressure, heating at a temperature of 1,100° C. to 1,600° C., generating SiO gas, continuously or periodically supplying oxygen to the SiO gas, and precipitating a mixture of gases on the surface of a cooled gas. However, according to this method, a process for preparing a SiO gas is necessary, and a decompression process, as well as the cooling of the mixture of gases, is necessary. Thus, process control is not easy, and an amount of a final product prepared by the preparation process may be somewhat low. Thus, the commercialization of such a powder is somewhat problematic.

In addition, Patent Document 4 provides a method including mixing a silicon dioxide powder and a silicon powder having a hydrogen concentration of 30 ppm or more, heating the mixture to a temperature of 1,250° C. to 1,350° C., vaporizing SiO, precipitating the SiO from a precipitation gas, and pulverizing the SiO. However, according to this method, the limitation of a process is accompanied by the control of a reaction gas, and high costs may be incurred due to an increase in electricity usage.

Patent Document 1: Japanese Laid-Open Patent Publication No. 2002-260651
Patent Document 2: Japanese Laid-Open Patent Publication No. 2011-142021
Patent Document 3: Japanese Laid-Open Patent Publication No. 2001-243535
Patent Document 4: Korean Laid-Open Patent Publication No. 2007-0020130

SUMMARY OF THE INVENTION

An aspect of the present invention provides silicon oxide for an anode of a secondary battery, having a good mechanical lifespan and electrical properties, a method for preparing the same and an anode of a secondary battery using the silicon oxide.

According to an aspect of the present invention, there is provided a method for preparing silicon oxide for an anode of a secondary battery including preparing a mixture by mixing $SiCl_4$ and ethylene glycol at a ratio of 10:90 to 70:30 by volume; manufacturing a gel by stirring the mixture at a temperature of 50° C. to 300° C. for 2 to 72 hours; and heat treating the gel at a temperature of 50° C. to 1,000° C.

In addition, according to another aspect of the present invention, there is provided a silicon oxide for an anode of a secondary battery, having a particle size of 50 to 150 nm.

According to another aspect of the present invention, there is provided an anode of a secondary battery comprising a SiOx-C complex phase in which the surfaces of silicon oxide particles having a particle size of 50 to 150 nm is surrounded by carbon particles.

According to the present invention, a nanoscale silicon oxide powder is prepared, and silicon oxide for an anode of a secondary battery, having an improved mechanical lifespan and improved energy storage material properties may be prepared. In addition, a preparation technique of silicon oxide and an anode material able to be undertaken at low cost with high productivity may be provided because of the properties of a preparation process.

BREIF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION AND BEST MODE

Figures 1A, 1B, 1C:
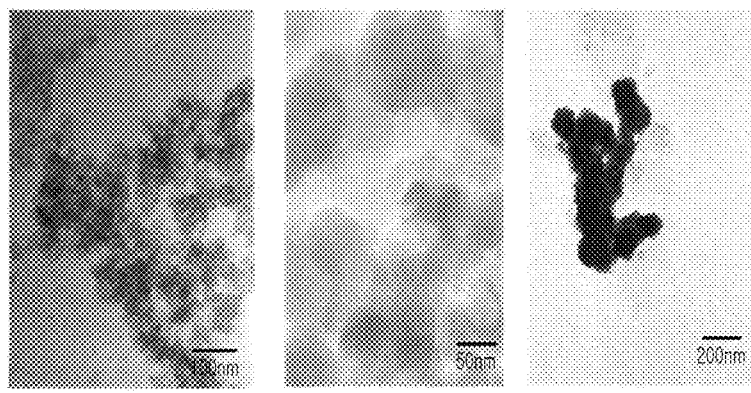
FIGS. 1A, 1B and 1C are photographic images of silicon oxides manufactured by changing the ratio of $SiCl_4$ to ethylene glycol according to an embodiment of the present invention.

Exemplary embodiments of the present invention will hereinafter be described in detail, with reference to the accompanying drawings.

First, a method of preparing silicon oxide for an anode of a secondary battery will be explained in detail.

$SiCl_4$ and ethylene glycol are prepared and mixed to prepare a mixture thereof. $SiCl_4$ and ethylene glycol are preferably mixed at a mixing ratio of 10:90 to 70:30 by volume. In the case in which the mixing ratio is less than 10:90, the amount of Si may be relatively small, and SiOx may not be formed. In the case in which the mixing ratio exceeds 70:30, an excessive amount of Si is included, and $SiCl_4$ may not be entirely dissolved. Thus, the mixing ratio is preferably from 10:90 to 70:30.

The purity of $SiCl_4$ is preferably at least 92%. When the purity thereof is less than 92%, impurities present in a starting material may be precipitated at the same time, and electrochemical properties may be deteriorated when $SiCl_4$ having a purity below 92% is used as an anode material of a finally manufactured battery.

The mixture is stirred at 50° C. to 300° C. for 2 to 72 hours to form a gel. When the reaction temperature is less than 50° C., a reaction with OH radicals in $SiCl_4$ and ethylene glycol may not be easy, and a sufficient amount of metal silicon may not be produced. When the reaction temperature exceeds 300° C., silicon oxide having a uniform particle size may not be produced due to the growth of grain of silicon oxide itself.

Meanwhile, when stirring is conducted for less than 2 hours, stirring may be insufficient, and minute particles of silicon oxide may not be obtained. When the stirring is conducted for more than 72 hours, the silicon oxide may not be produced due to the self oxidation of the reaction material of $SiCl_4$.

The gel is heat treated at 500° C. to 1,000° C., and silicon oxide is obtained. When the temperature of a heat treatment is less than 500° C., crystallization may not be attained, and a reaction with lithium may be problematic when used in the material for an anode of a secondary battery. When the heat treating temperature exceeds 1,000° C., the crystal growth of silicon oxide (SiOx) may not be attained due to a carbonization reaction in the gel. The heat treatment is preferably conducted under an inert atmosphere. The inert atmosphere is not specifically limited and means an atmosphere using an inert gas such as hydrogen, nitrogen, argon or a mixture thereof.

Meanwhile, the heat treatment is preferably conducted for 1 to 5 hours. When the heat treatment is conducted for less than 1 hour, such a heat treatment may be insufficient, and the reduction reaction of a gel may occur. When the heat treatment is conducted for over 5 hours, reoxidation may occur due to the supply of heat energy over a long period of time and due to an excessive amount of reduction.

Hereinafter, silicon oxide will be explained in detail.

Silicon oxide prepared by the above method has a particle size of 10 nm to 150 nm. Since the silicon oxide has the particle size of 10 nm to 150 nm, lifetime deterioration due to the increase of the volume of a silicon-based anode material and the generation of crack may be solved. That is, since the particle size is 10 nm to 150 nm as described above, the mechanical stress generated during the increase of the volume may decrease, and the generation of cracks and mechanical breakage due to the volume change may be restrained.

Hereinafter, an anode of a secondary battery of the present invention will be explained in detail.

The anode material of the present invention preferably has a SiOx-C complex phase in which carbon (C) is combined with silicon oxide. The SiOx-C complex phase is preferably a complex phase in which the anode material of the present invention has a core shell structure in which carbon surrounds spherical SiOx particles or a shape in which carbon particles surround spherical SiOx particles. The mixing ratio of SiOx and C is preferably 1:9 to 8:2 by weight. When the mixing ratio is less than 1:9, the amount of SiOx is entirely lacking, and the increase of anode capacity may not be expected. When the mixing ratio exceeds 8:2, the amount of carbon is lacking, and the increase of the volume through the oxidation of SiOx to $SiO_2$ may not be restrained.

Meanwhile, the manufacturing of the SiOx-C complex phase may be conducted through a dry method or a wet method using the silicon oxide with carbon. However, the method is not specifically limited in the present invention.

According to an embodiment, the SiOx-C complex phase is preferably manufactured by mixing silicon oxide with a carbon material such as pitch, graphite powder, graphene, graphite, carbon nanotubes (CNT), or the like by using a ball mill at a rate of 100 to 1,000 rpm, and heat treating the mixture under an inert atmosphere of argon gas at 500° C. to 900° C. for 10 minutes to 5 hours.

When the ball milling rate is less than 100 rpm, the mixing of SiOx and carbon may not be easily conducted, and diffusion during conducting final heat treatment is not easy. When the ball milling rate is greater than 1,000 rpm, the ball milling process is too excessive, and the particle size of the SiOx powder may be excessively small. Thus, a core shell structure or a surrounded shape of the SiOx particles with carbon particles may not be formed. Meanwhile, when the heat treating temperature is less than 500° C., the diffusion of carbon may not occur, and the SiOx-C complex phase may not be formed, and when the heat treating temperature exceeds 900° C., the particle size of SiOx may be excessively grown in an inert atmosphere. Thus, the particle size may be increased to deteriorate capacity, and so, the temperature is necessary to be delimited. With respect to the heat treating time period, when the heat treatment is undertaken for less than 10 minutes, carbon diffusion may not occur due to the incompleteness of a temperature gradient. When the heat treating time exceeds 5 hours, excessive carbon diffusion may occur, and the complex phase having the core shell or surrounding the SiOx may not be formed.

Hereinafter, preferred embodiments of the present invention will be described in detail. However, the following embodiments are only for the purposes of illustration, and the present invention is not limited thereto.

Example 1

A $SiCl_4$ solution having a purity of 97% was mixed with ethylene glycol, followed by stirring. The stirring was conducted at a temperature of 50° C. to 100° C. for 12 hours to form a gel. The gel thus formed was heat treated under a hydrogen atmosphere at a temperature of 800° C. for 2 hours to manufacture silicon oxide.

During mixing, the $SiCl_4$ solution and ethylene glycol were mixed at ratios of 30:70, 50:50 and 70:30 by volume. The silicon oxides thus prepared were observed, and photographic images thereof are provided in FIGS. 1A, 1B and 1C. As shown in FIGS. 1A, 1B and 1C, silicon oxide prepared by the method of the present invention has minute crystals having a size of 10 to 150 nm. Through the results, it was seen that defects including exfoliation due to the increase of volume and the lifetime decrease of a battery, exhibited in a Si-based anode material of related art, could be solved.

Example 2

500 mL of a $SiCl_4$ solution having a purity of 97% and 500 mL of ethylene glycol (50:50 by volume ratio) were prepared, and silicon oxide was prepared by undertaking the same procedure as described in Example 1.

By using the silicon oxide thus prepared, a SiOx-C complex phase was manufactured. To manufacture the SiOx-C complex phase, SiOx:carbon pitch were mixed at a ratio of 100:20 by weight. The mixture was inserted into a widemouth bottle with 10 numbers of zirconia balls (5 mm). Low energy ball milling was conducted at a rate of 100 rpm for 12 hours. Then, the resultant mixture was inserted into a crucible, and the crucible was inserted into an electric furnace. Under an Ar gas atmosphere, the temperature was increased by 5 degrees per minute to 900° C., was maintained at 900° C. for 1 hour and was then decreased by 5 degrees per minute to produce a final complex phase.

Figure 2:
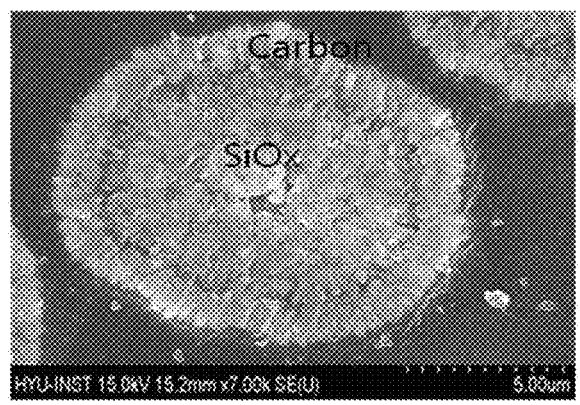
FIG. 2 is a photographic image on a SiOx-C complex phase according to an embodiment.

The SiOx-C complex phase thus manufactured was observed, and a photographic image thereof is illustrated in FIG. 2. As shown in FIG. 2, the SiOx-C complex phase was confirmed to have a core shell structure.

Figure 3:
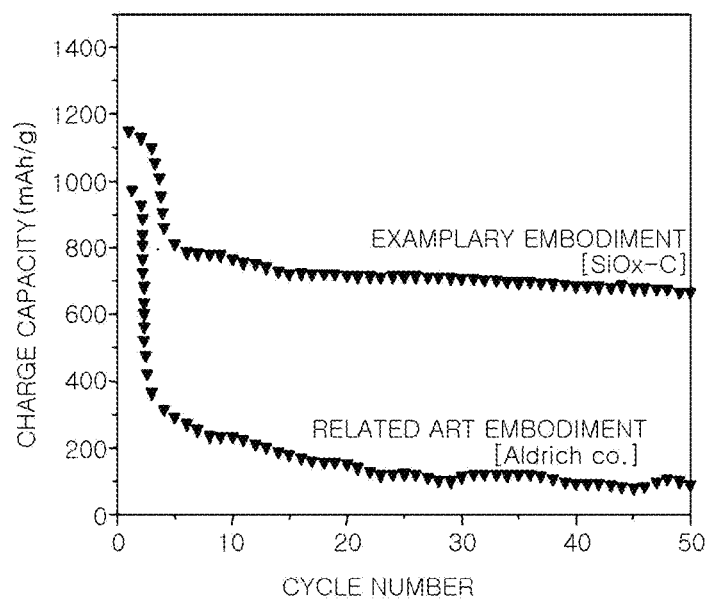
FIG. 3 is a graph illustrating test results of charging and discharging according to an example embodiment and an embodiment of related art.

Meanwhile, a charging and discharging test was conducted by using an anode material (example embodiment) using the SiOx-C complex phase and an anode material (embodiment of related art) using SiOx purchased from Aldrich Co., and the results are illustrated in FIG. 3.

For conducting the charging and discharging test, SiOx-C as an anode active material, ketjen black as a conductive material, and plyvinylidene fluoride (PVdF) as a binder were mixed at a ratio of 90:2:8 by weight, and the mixture was mixed with N-methyl-2-pyrrolidone (NMP) solvent to prepare an anode slurry. One side of a copper current collector was coated with the anode slurry thus manufactured, and dried at about 130° C. for 2 hours to manufacture an anode having a size of 1,4875 $cm^2$.

Ethylene carbonate (EC) and diethyl carbonate (DEC) were mixed at a ratio of 1:2 by volume, and $LiPF_6$ was added in a non-aqueous electrolyte solvent to prepare a 1M $LiPF_6$ non-aqueous electrolyte. A lithium metal foil was used as a cathode, a polyolefin separator was disposed between both electrodes, and the electrolyte was injected to manufacture a coin type half cell.

As shown in the results illustrated in FIG. 3, the capacity and the lifetime were confirmed to increase by 80% or more for the example embodiment of the present invention when compared to an embodiment of related art. Since the increase of the volume of SiOx is restrained, a sufficient space for storing lithium is present. In addition, since the crystalline structure of SiOx is stable, a space for intercalating lithium is sufficient. Further, the intercalation and deintercalation of lithium may be possible due to the stable crystal phase even though repeatedly conducting intercalation and deintercalation of lithium.

While the present invention has been shown and described in connection with the exemplary embodiments, it will be apparent to those skilled in the art that modifications and variations can be made without departing from the spirit and scope of the invention as defined by the appended claims.

The invention claimed is:

1. A method for preparing silicon oxide for an anode of a secondary battery comprising:
    preparing a mixture by mixing $SiCl_4$ and ethylene glycol at 10:90 to 70:30 by volume;
    manufacturing a gel by stirring the mixture at 50° C. to 300° C. for 2 to 72 hours; and
    heat treating the gel at 500° C. to 1,000° C.

2. The method for preparing silicon oxide for an anode of a secondary battery of claim 1, wherein the $SiCl_4$ has a purity of 92% or above.

3. The method for preparing silicon oxide for an anode of a secondary battery of claim 1, wherein the heat treating is conducted under a reducing atmosphere.

4. The method for preparing silicon oxide for an anode of a secondary battery of claim 3, wherein the reducing atmosphere uses at least one gas selected from the group consisting of a hydrogen gas, a nitrogen gas, an argon gas or a mixture thereof.

5. The method for preparing silicon oxide for an anode of a secondary battery of claim 1, wherein the heat treating is conducted for 1 to 5 hours.

6. Silicon oxide for an anode of a secondary battery having a particle size of 50 to 150 nm, wherein the silicon oxide is prepared by a method comprising:
    preparing a mixture by mixing $SiCl_4$ and ethylene glycol at 10:90 to 70:30 by volume;
    manufacturing a gel by stirring the mixture at 50° C. to 300° C. for 2 to 72 hours; and
    heat treating the gel at 500° C. to 1,000° C.

7. An anode of a secondary battery comprising a SiOx-C complex phase in which carbon particles surround a surface of silicon oxide having a particle size of 50 to 150 nm, wherein the SiOx-C complex phase is manufactured by mixing the silicon oxide prepared by a method comprising:
    preparing a mixture by mixing $SiCl_4$ and ethylene glycol at 10:90 to 70:30 by volume;
    manufacturing a gel by stirring the mixture at 50° C. to 300° C. for 2 to 72 hours; and
    heat treating the gel at 500° C. to 1,000° C.,
    with at least one carbon material of graphite, pitch, graphene and carbon nanotubes (CNT) by ball milling at 100 to 1,000 rpm, and heat treating at 500° C. to 900° C. for 10 minutes to 5 hours.

8. The anode of a secondary battery of claim 7, wherein the SiOx-C complex phase has a core shell shape or a shape in which spherical SiOx is surrounded by carbon particles.

* * * * *